(12) United States Patent
Yanagidaira

(10) Patent No.: US 6,490,052 B1
(45) Date of Patent: Dec. 3, 2002

(54) PRINTER CONTROLLER

(75) Inventor: Kazumi Yanagidaira, Tokyo (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 09/334,668

(22) Filed: Jun. 17, 1999

(30) Foreign Application Priority Data

Jun. 19, 1998 (JP) .......................................... 10-173689

(51) Int. Cl.[7] .............................. G06F 3/12; G06F 13/00
(52) U.S. Cl. ....................................... 358/1.15; 709/203
(58) Field of Search ........................ 358/1.15; 709/218, 709/203; 707/104, 205; 370/395.52, 395.53; 710/5, 11, 46

(56) References Cited

U.S. PATENT DOCUMENTS

| | | | |
|---|---|---|---|
| 5,727,135 A | 3/1998 | Webb et al. ............... | 395/113 |
| 6,026,436 A | 2/2000 | Hawes ...................... | 709/218 |
| 6,208,428 B1 * | 3/2001 | Chihara et al. ........... | 358/1.15 |
| 6,327,045 B1 * | 12/2001 | Teng et al. ................ | 358/1.15 |

FOREIGN PATENT DOCUMENTS

| | | | | |
|---|---|---|---|---|
| EP | 0 843 230 A2 | 5/1998 | ......... | G06G/15/00 |
| EP | 0 872 792 | 10/1998 | ............. | G06F/3/12 |
| EP | 0 874 306 | 10/1998 | ............. | G06F/3/12 |
| EP | 0 923 024 | 6/1999 | ............. | G06F/3/12 |
| JP | 03-029019 | 2/1991 | ............. | G06F/3/12 |
| JP | 06-324823 | 11/1994 | ............. | G06F/3/12 |
| JP | 9-185472 | 7/1997 | ............. | G06F/3/12 |
| JP | 9-311769 | 12/1997 | ............. | G06F/3/12 |
| JP | 10-041861 | 2/1998 | ............. | H04B/3/46 |
| JP | 10-149270 | 6/1998 | ............. | G06F/3/14 |
| JP | 11-74913 | 3/1999 | ............. | G06F/3/12 |
| JP | 11-265268 | 9/1999 | ............. | G06F/3/12 |
| WO | WO 99/15955 | 4/1999 | ............. | G06F/3/12 |

OTHER PUBLICATIONS

Concise Statements of Relevance of the cired references.

* cited by examiner

*Primary Examiner*—Joseph Mancuso
*Assistant Examiner*—Douglas Tran
(74) *Attorney, Agent, or Firm*—McGinn & Gibb, PLLC

(57) ABSTRACT

The printer controller controls the shared printer of a network to which the clients are connected. The clients are provided with browsers. The printer controller operates on the printer server which has a function of sending home page data containing information about the shared printer corresponding to URL from the clients connected to the network. The printer controller sends the home page data containing the information about the shared printer and performs at least one or more of operation monitoring, check and instruction of the shared printer connected to the printer server according to the received URL indicating a request of that.

17 Claims, 10 Drawing Sheets

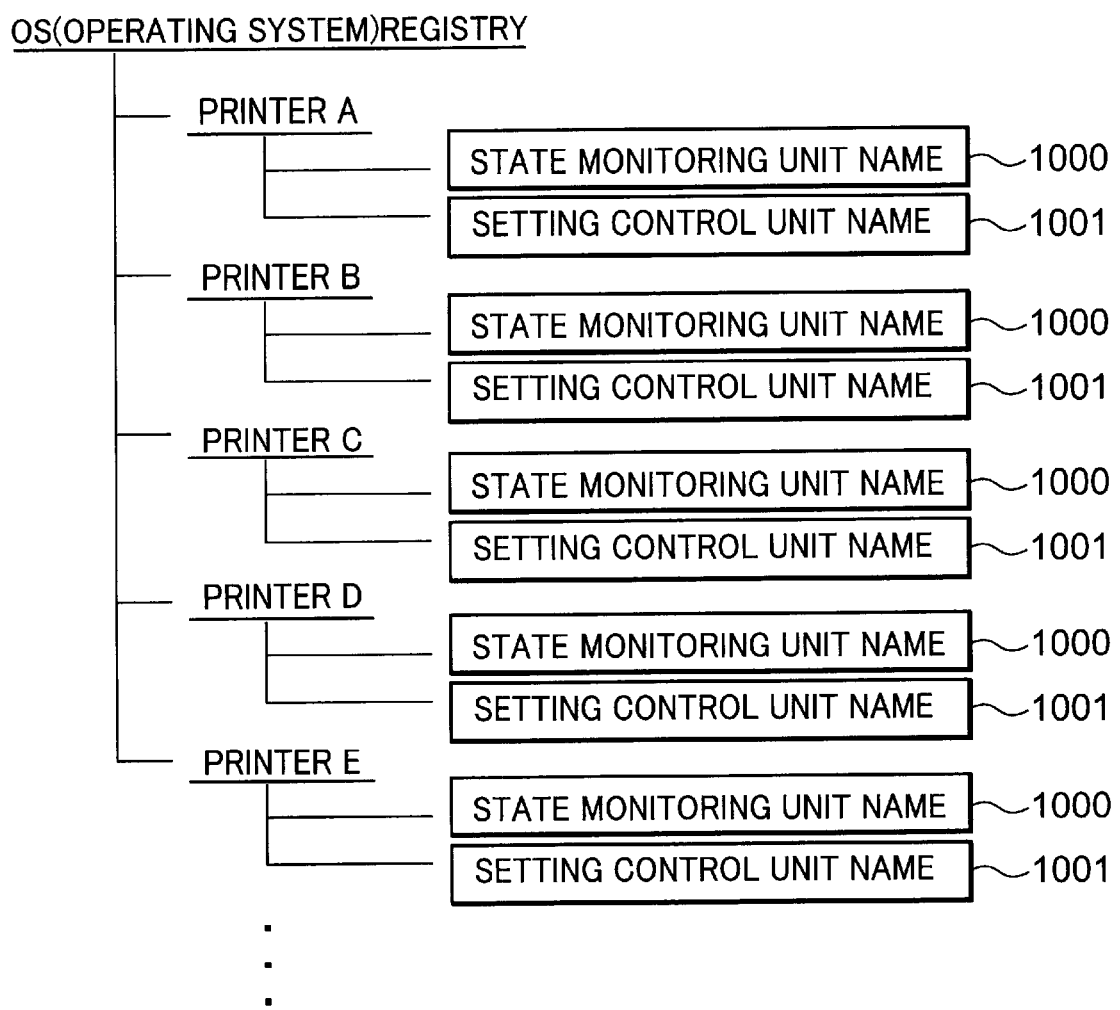

PRINTER CONTROLLER

BACKGROUND OF THE INVENTION (i) Field of the Invention

The present invention relates to a printer controller and a program recording medium recording a program in which the printer controller is embodied. Specifically, it relates to a printer controller installed for a printer which is connected to a network and a program recording medium recording the program in which the printer controller is embodied.

(ii) Description of the Related Art

In recent years, to share software resources such as data and software or hardware resources such as a printer and a modem in the environment where a plurality of computers are used by many users, it is becoming general to form a network by connecting the computers to each other. Over such network, it is general to use printers and databases shared by host computers in the network, and in order to perform batch processing for printers and databases for requests from host computers, a computer called a server is installed. For example, when a plurality of host computers (hereinafter referred to as "clients") are used together with a printer, a printer server is installed. The printer server is a computer which provides the service sharing the printer and has the function of performing the operation setting and change of the printer setting in accordance with requests from the client.

Before the printer server is introduced, the operating state of a printer is displayed on a small liquid crystal panel mounted on the printer and the printer is also set with a small number of limited buttons mounted on the printer. However, the display of such a liquid crystal panel is exceedingly hard to see and such buttons are hard to use because of their bad operability. Moreover, if the printer is located at a site separated from the client, it is difficult for a user of the client machine to always identify the operation of the printer. To solve these problems, such a printer controller has been installed over a network up to this time, that can identify the printer operation from the client.

For example, as disclosed in the Japanese Patent Laid-Open Publication No. Hei 9-185472 and the Japanese Patent Laid-Open Publication No. Hei 9-311769, a user of the client is provided with the information about the operating state of the printer such as print status or error occurrence on the display window of a client machine in real time by using a GUI (graphical user interface). Similarly, it is able to set the operation of the printer in real time by using such GUI.

However, the prior art described above includes the following problems. If such GUI as described above is used over a network, a dedicated controller has to be installed in both the server and the client machines that are scheduled to use the printer including both the server and client machines. This is because the server and the client machines become able to mutually communicate with each other by installing dedicated controllers and perform the operation monitoring and setting of the printer. In particular, in a large-scale network environment, the workload of installing the dedicated controller in such machines is heavy.

Moreover, whenever a new printer is additionally installed in a network, such printer-dedicated controller must be installed in all the machines that are scheduled to use the printer, and the workload required for such installation work is also heavy.

SUMMARY OF THE INVENTION

The present invention has been developed in consideration of the problems in the prior art described above, and it can apply to the printer controller and a recording medium recording the program in which the printer controller is embodied.

An object of the present invention is to provide, in a printer installed in a network, a printer controller which can greatly reduce the workload during printer installation and a recording medium recording the program in which the printer controller is embodied.

Further, an object of the present invention is to provide a printer controller which can easily perform the operating state monitoring, check and instruction of the printer from a client and a recording medium recording the program in which the printer controller is embodied.

To solve the issues, the printer controller of the first invention according to this application is installed over a network to which a printer server, a client and a printer are connected. Further, the printer controller performs the communication between the client and printer via the printer server. Moreover, the printer server has the function of a web server and has the function of setting at least one or more of the operation monitoring, check and instruction of the printer by a client browser.

Accordingly, the operating state of such printer can immediately be identified when the operating state of such printer must be obtained on the client. Besides, when a new printer is installed, because the step of individually installing a dedicated controller which corresponds to the new printer is not required, the workload required for installing the printer in the network can greatly be reduced.

Further, the printer controller of the second invention according to this application is installed over a network to which a printer server, a client and a printer are connected. Further, the printer controller performs the communication between the client and printer via the printer server. Moreover, the printer server has the function of communicating with a browser and has the function of setting at least one or more of the operation monitoring, check and instruction of the printer by the client browser.

Accordingly, the operating state of such printer can immediately be identified when the operating state of such printer must be obtained on the client. Besides, when a new printer is installed, because the step of individually installing a dedicated controller which corresponds to the new printer is not required, the workload required for installing the printer in the network can greatly be reduced.

Furthermore, in the third invention according to this application, the printer controller of the above first invention further comprises a control unit for communicating with a printer server and a database. The database communicates with the control unit and manages the printer information sent from the printer in a batch. Further, the control unit receives the browser information sent from the client browser from the printer server and sends the operation setting request and/or change request of the printer to the database as needed.

Accordingly, for example, whenever a new printer is added to a network, because the environment of the control unit and the entire printer server need not be updated, the workload required for additionally installing the printer in the network can greatly be reduced. Besides, because the information about all the printers connected to the network can immediately be detected, the maintainability of the network can be improved.

Further, in the fourth invention according to this application, the printer controller of the above first invention further comprises a control unit for communicating with a printer server and a database. The database manages the printer information sent from the printer in a batch and the printer server are provided. Further, the control unit receives the printer information from the database and sends it to the printer server.

Accordingly, for example, whenever a new printer is additionally installed in a network, because the environment of the control unit and the entire printer server need not be updated, the workload required for additionally installing the printer in the network can greatly be reduced. Besides, because the information about all the printers connected to the network can immediately be detected, the maintainability of the network can be improved.

Furthermore, the fifth invention according to this application is the printer controller of the above first invention, wherein the printer information is displayed on a client browser.

Accordingly, because the operating state of the printer is displayed as an image formed using a graphical user interface, a user of the client machine can easily identify the operating state of the printer.

Besides, in the sixth invention according to this application, the printer controller of the above first invention further comprises a control unit comprises a state monitoring unit which obtains the operating state of a printer. And the printer controller further comprises a setting control unit which obtains the operation setting value of the printer from a database and updates the setting value as needed. Further, the setting control unit and the state monitoring unit are installed in the control unit independently of the database, respectively.

Accordingly, whenever a new printer is additionally installed in a network, because the environment of the control unit and the entire printer server need not be updated, the workload required for additionally installing the printer in the network can greatly be reduced.

Further, the seventh invention according to this application is the printer controller of the above sixth invention, wherein a setting control unit and/or a state monitoring unit is installed corresponding to a printer.

Accordingly, whenever a new printer is added to a network, the workload regarding the additional setting of the printer can be reduced. This is because the setting control unit and/or the state monitoring unit corresponding to the new printer may simply be installed and the environment of the control unit and the entire printer server need not be updated.

Furthermore, the eighth invention according to this application is the printer controller of the above sixth invention, wherein a setting control unit has a polling setting control means which executes polling every fixed time.

Therefore, the operating state of the printer is automatically updated when a preset, predetermined time elapses. Accordingly, because a user need not perform any update procedure on purpose, the workload of a user of the client machine can be reduced.

Besides, the ninth invention according to this application is the printer controller of the above sixth invention, wherein a setting control unit has a polling setting control means which executes polling every fixed time.

Therefore, the operating state of the printer is automatically settled when a preset, predetermined time elapses. Accordingly, because a user need not perform any update procedure on purpose, the workload of a user of the client machine can be reduced.

Further, in the tenth invention according to this application, the state monitoring unit of the above sixth invention has an image data unit for generating an image file. Therefore, an appropriate and detailed image corresponding to a printer can be provided.

Furthermore, the 11th invention according to this application is a storage medium recording a program and a recording medium recording the program, wherein the printer controller of the above first invention according to this application is embodied.

Accordingly, when such program is recorded in the recording medium, the printer controller can easily be installed in the printer server even if such program becomes a high-capacity one.

The present invention attains the objects described above by each of these means.

BRIEF DESCRIPTION OF THE DRAWINGS

FIG. 10 is a diagram showing an example of the plug-in information inside the printer server in the printer controller according to the first and second embodiments of the present invention.

DETAILED DESCRIPTION OF THE PREFERRED EMBODIMENT

The embodiments of the present invention are described below with reference to the drawings, but each of the following embodiments is only an example showing a printer controller according to the present invention and a recording medium recording the program in which the printer controller is embodied.

(First Embodiment)

The printer controller according to this embodiment is connected to a network to which host computer machines (hereinafter referred to as "clients") are connected and operates on a printer server machine (hereinafter referred to as a "printer server") which connects a single network shared printer or a plurality of network shared printers enabling bidirectional communication to a local port.

Figure 1:
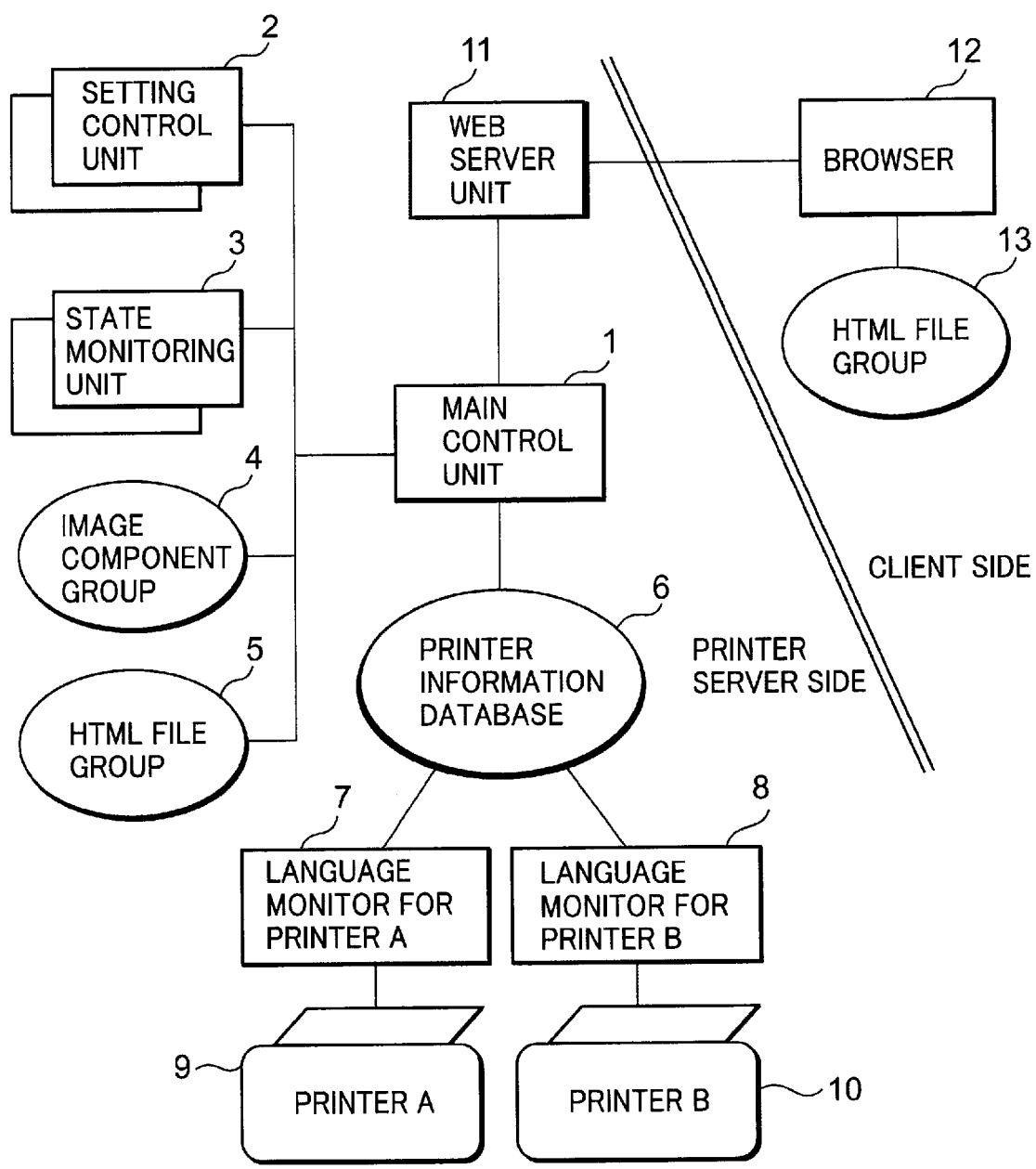
FIG. 1 is a block diagram showing the configuration of the printer controller according to the first embodiment of the present invention.

FIG. 1 is a block diagram showing the configuration of the printer controller according to the first embodiment of the present invention.

Two printers A9 and B10 are connected to the local port of the printer server and function as a network shared printer. A language monitor 7 for a printer A and a monitor 8 for a printer B are installed in the printer server corresponding to the printers A9 and B10, respectively. The language monitor 7 for the printer A and the language monitor 8 for the printer B are language monitors exclusively used for the printers A and B. respectively. Each language monitor performs communication with its corresponding printer and records the operating state (usually, paper-empty, paper-jam or power off) of each printer in a printer information database 6 each time communication is performed. Further, the operation setting state (for example, operation mode, power saving function or setting of a paper feed or ejection destination) of the printer instructed from a client according to the method described later is also recorded in the printer information database 6. The language monitor 7 for the printer A and the monitor 8 for the printer B perform the internal operation setting of each corresponding printer based on the setting state recorded in the printer information database 6.

A main control unit 1 is the main controller which communicates with a web server unit 11 on the printer server described later and the printer information database 6. The main control unit 1 sends the operating and setting states of each printer recorded in the printer information database 6 to a client based on the request received from the client via the web server unit 11.

Hereupon, the printer server according to the present invention is characterized in that it is provided with the function as a web server, and the client according to the present invention is characterized in that it is provided with a browser 12. Besides, no dedicated controllers need be installed on the client and the environment where the browser 12 operates, may be acceptable.

The client browser 12 generates a URL (universal resource locator) indicating the site of the information whose acquisition is requested based on the operation of a user. The URL is sent from the client to the printer server via a network. When the printer server generates the home page data containing the information about the state of the printer corresponding to the URL and sends it to the client, an image indicating the state of the printer is displayed on the client.

This image displays the operating and setting states of each printer and contains an image which a user uses to instruct the setting change of the printer. In accordance with the operation which the user performs by using this image on the client display, the URL which corresponds to the operation is sent from the browser 12 to the printer server. For example, by aligning the cursor displayed on the image to the position of the icon displayed on the image using the mouse and pressing the mouse button, the URL which corresponds to the operation is sent from the browser 12 to the printer server. The transmission of the URL allows the browser 12 to request acquisition of the image which displays the setting state after the setting is instructed. and also, the transmission of the URL allows the browser 12 to instruct the setting of the printer.

The main control unit 1 receives the URL indicating the request of the information about the operating state of the printer from the browser 12 which operates on a client via the web server unit 11. Then, it calls a state monitoring unit 3 of the corresponding printer recognized with reference to a registry. The state monitoring unit 3 obtains the operating state of the corresponding printer based on the URL with reference to the printer information database 6 and generates a necessary HTML file group.

Similarly, when the main control unit 1 receives the URL indicating the request of the specification, operation setting or operation update of the printer from the client browser 12, it calls a corresponding setting control unit 2. The setting control unit 2 detects the request of the specification or update of the setting state of the printer which corresponds to the printer information database 6 from the URL. The setting control unit 2 records the setting required for the printer information database 6, obtains other setting states and generates a necessary HTML file group.

The main control unit 1 manages the file group required for generating and display an image on a client as an image component group 4 and an HTML file group 5. When a request is issued from the browser 12, the main control unit generates the file group corresponding to a URL and transfers it to the web server unit 11. The web server unit 11 sends the transferred file group to the browser requested via a network. The browser 12 receives the transmitted file group, displays the operating and setting states of a desired printer based on the file group, and displays an image which a user uses to instruct the setting change of the printer.

The image displaying the operating and setting states of the printer is comprised by combining a plurality of frames which are partial images. For example, the basic frame which comprises the image of the title portion or the entire frame and the operation state display and setting state display frames which comprise the image of each portion arranged in the basic frame are provided. The basic frame and a partial frame which comprises the image of each portion are created based on a separate HTML file and the partial frame is arranged in the basic frame based on the HTML file commands of the basic frame. The HTML file group 5 consists of HTML files of these basic and partial frames. Further, the image component group 4 consists of image files required for generating an image arranged in each frame based on these HTML file commands.

Moreover, a URL is created in accordance with a predetermined description format called an interface including arguments which correspond to the HTML file and image component of each partial image whose acquisition is requested. The setting control unit 2 and the state monitoring unit 3 analyze the URL received from the main control unit 1 and the client browser 12 and generate the HTML file and image component of the requested individual partial image.

Further, depending on the type of a printer to be supported, the information about the operating and setting states of the printer differs. For example, the setting regarding the operations of options such as sorters (there are many steps of sorters which enable sorting and output BIN specification) and finishers (highly functional ejectors such as a stapler, punch, and folder) differ depending on types. Furthermore, the setting parameters regarding the control of an engine which is the mechanical-unit controller of the printer such as control of print density also differ depending on types. Besides, depending on the difference in the printer option configuration, difference in the engine and difference in the printing speed performance, the data received on state monitoring differs. Accordingly, the setting control unit 2 and the state monitoring unit 3 are created according to the type of the printer. Moreover, the image component group 4 and the HTML file group 5 for generating a frame which depends on the type of the printer are also prepared every printer types.

The OS (operating system) of a printer server has a setting value storage portion called a registry. A printer name and its corresponding state monitoring and setting control unit names are written in the registry of the printer server as plug-in information. The main control unit 1 checks the registry and recognizes these file names which correspond to the printer to be connected each time it is activated.

When the main control unit 1 receives the URL indicating the request of the operating state of the printer from the browser 12 which operates on a client via the web server unit 11, it calls the state monitoring unit 3 of the corresponding printer with reference to the registry. The state monitoring unit 3 obtains the operating state of the corresponding printer based on the URL with reference to the printer information database 6 and generates a necessary HTML file group.

Similarly, when the main control unit 1 receives the URL indicating the request of the specification, operation setting or operation update of the printer from the client browser 12, it calls the corresponding setting control unit 2 with reference to the registry. The setting control unit 2 detects the request of the specification or update of the setting state of the printer which corresponds to the URL and performs recording of the requested setting for the printer information database 6. The setting control unit 2 obtains other setting states along with this. Then it generates a necessary HTML file group corresponding to the setting states.

If a type of a printer is needed to be added, the state control unit 2 and the state monitoring unit 3 are added to the printer server. Further, the image component group 4 and the HTML file group 5 for generating a frame which depends on the type of the printer are added to the printer server, too. And the printer name of the added printer and the names of its corresponding state monitoring and setting control unit are added to the registry of the printer server.

Because the main control unit checks its registry write site each time it is activated, it can recognize these file names which correspond to the added printer and can call the state monitoring unit or setting control unit having its file name.

Next, the operation of the printer controller of the present invention is described with reference to its flowchart and screen image.

Figure 2:
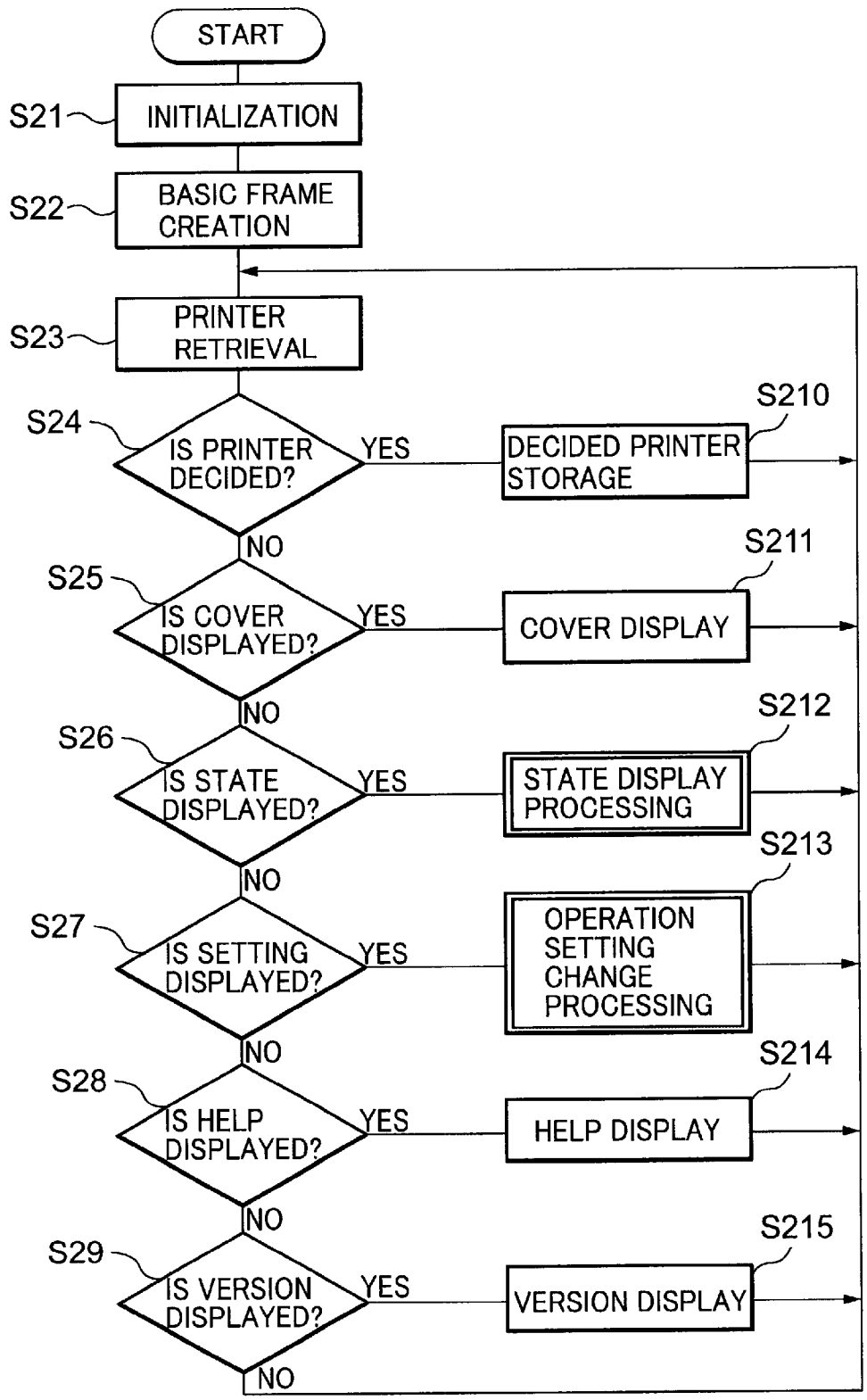
FIG. 2 is a flowchart showing the function of the control unit installed in the printer controller according to the first embodiment of the present invention.

FIG. 2 is a flowchart showing the function of the main control unit 1 installed in the printer controller according to one embodiment of the present invention.

Figure 8:
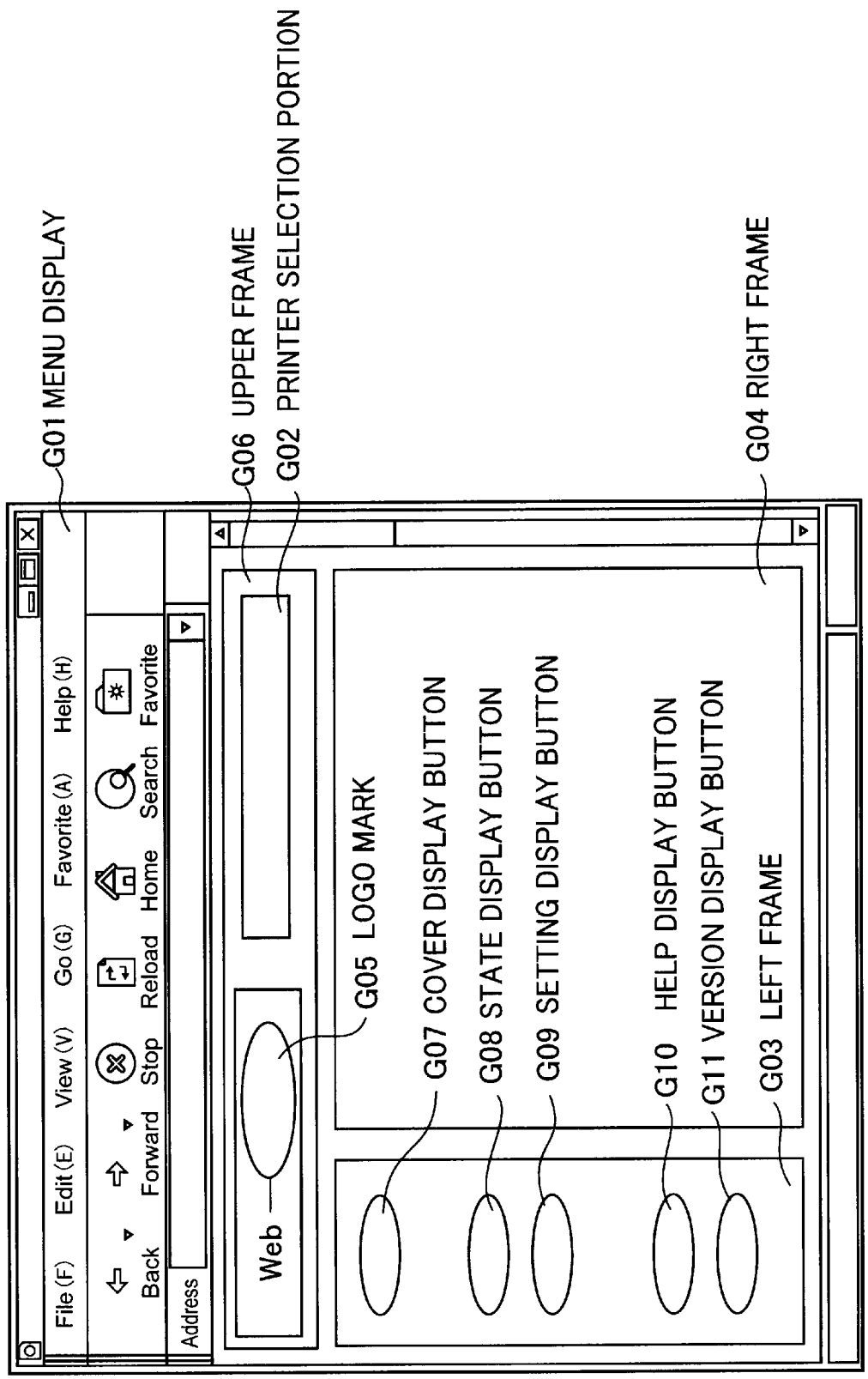
FIG. 8 is a diagram showing an example of the screen image displayed on the browser which operates on the client display window in the control printer according to the first and second embodiments of the present invention.

FIG. 8 is a diagram showing an example of the screen image displayed on the browser 12 which operates on the client display window in the printer controller according to one embodiment of the present invention.

FIG. 10 is a diagram showing an example of the plug-in information inside the printer server in the printer controller according to one embodiment of the present invention.

When a URL from the browser is received and the main control unit 1 is called from the web server unit 11 and activated, frame initialization is performed (Step S21). When the preparation work such as the setting of internal information or work area used in this step, the HTML file group and the image component group of the basic frame are generated (Step S22).

Subsequently, the main control unit 1 generates the HTML file group and image component group of a left frame G03, a right frame G04 and an upper frame G06 which are the basic frames displayed by the browser 12. It generates the HTML file group and image component group which display a logo mark G05 on the upper frame G06. It generates the HTML file group and image component group which arrange a cover display button G07, a state display button G08, a setting display button G09, a help display button G10 and a version display button G11 on the left frame G03. It generates the HTML file group and image component group which display the cover as an initial state on the left frame G04. When the generation of the HTML file group and image component group of the basic frame is completed, the OS of the printer server executes retrieval of the printer to be supported (Step S23). This retrieval method obtains a list of printers using an open interface and, based on the list, compares it with the plug-in information written in the data area called a registry and decides it when each printer is additionally installed in a network.

An example regarding the plug-in information is shown in FIG. 10. As shown in FIG. 10, a state monitoring unit name 1000 given corresponding to the name of each printer and a setting control unit name 1001 given corresponding to the name of each setting control unit are recorded in a predetermined site.

The name of the retrieved printer is displayed as a list on the printer selection portion G02 so that client users can specify the printer they use. When whether a printer is specified by a user is judged (Step S24) and that it is specified is detected, the decided printer is recorded (Step S210) and Step S23 is returned.

If no printer is specified, whether there is the operation of cover display by a user is judged (Step S25). When the operation of cover display is detected, the cover is displayed on the right frame G04 (Step S211) and Step S23 is returned. If the operation of cover display is not detected, whether there is the operation of printer state display by the user is judged (Step S26). When the operation of printer state display is detected, by referring to the registry which corresponds to the recorded printer, the specified state monitoring unit 3 is called. The state display processing of the printer is performed. The operating state of the printer is displayed on the right frame G04 portion (Step S212) and Step S23 is returned.

If the operation of the printer state display is not detected, whether there is the operation of printer setting display is judged (Step S27). When the operation of printer setting display is detected, the setting control unit 2 for the printer operation is called, the setting display is performed on the right frame G04, the operation change processing of the printer is performed (Step S213) and Step S23 is returned.

Further, if there is no operation of printer setting display, whether there is no operation of help display is judged (Step S28). When the operation of help display is detected, the help display is performed, the help in which the use method and the link information into a related site is displayed on the right frame G04 (Step S214) and Step S23 is returned.

If the operation of help display is not detected, whether the display operation of the version information is judged (Step S29). When the display operation of the version information is detected, a version and a copyright are displayed on the right frame G04 (Step S215) and Step S23 is returned.

If the display operation of the version information is not detected, Step S23 is returned as is.

Figure 3:
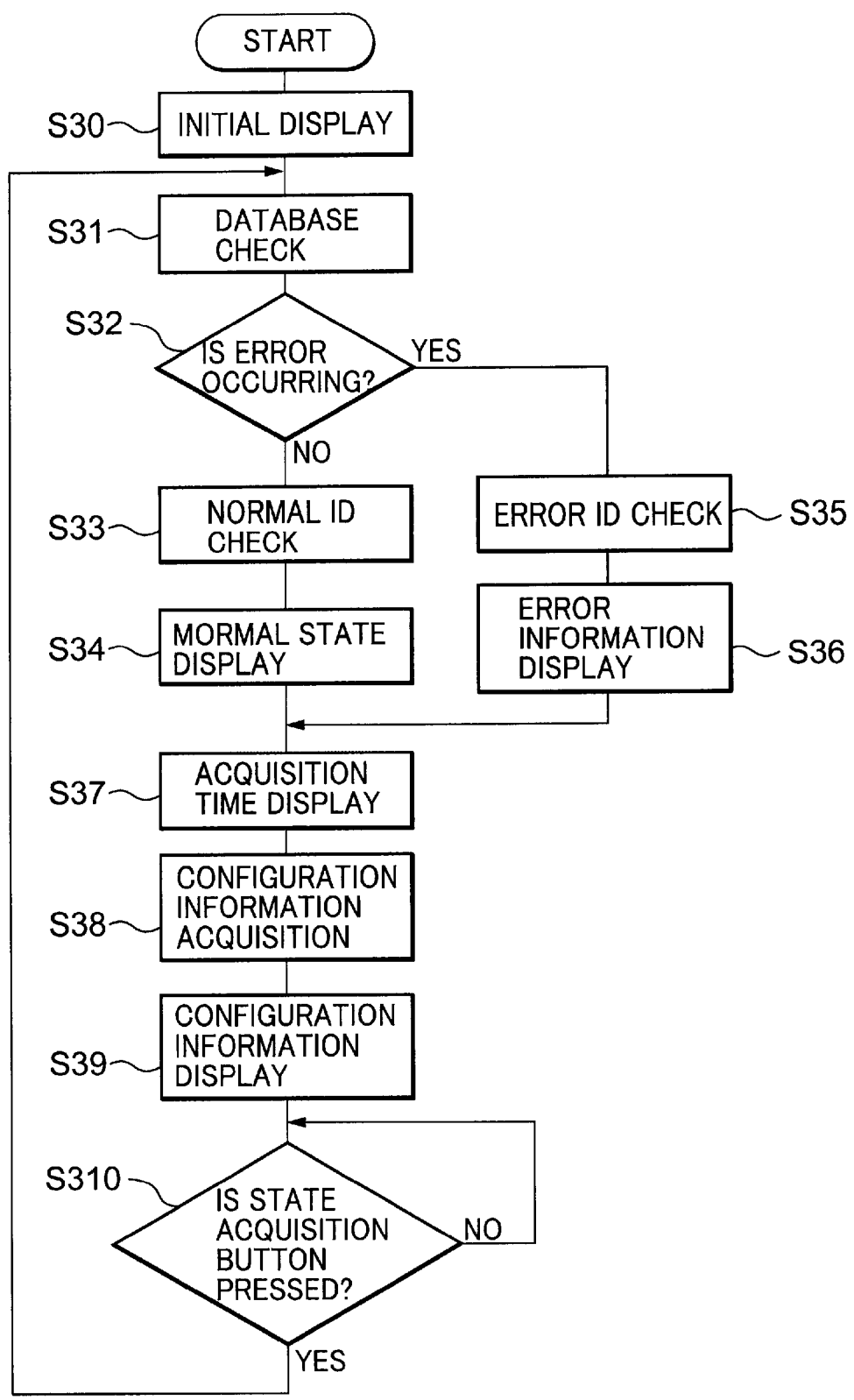
FIG. 3 is a flowchart showing the function of the state monitoring unit installed in the printer controller according to the first embodiment of the present invention.

Next, the operation of the state monitoring unit 3 which performs the state display processing of the printer (Step S212) in FIG. 2 is described referring to the flowchart of FIG. 3.

FIG. 3 is a flowchart showing the function of the monitoring unit 3 installed in the printer controller according one embodiment of the present invention.

Figure 9:
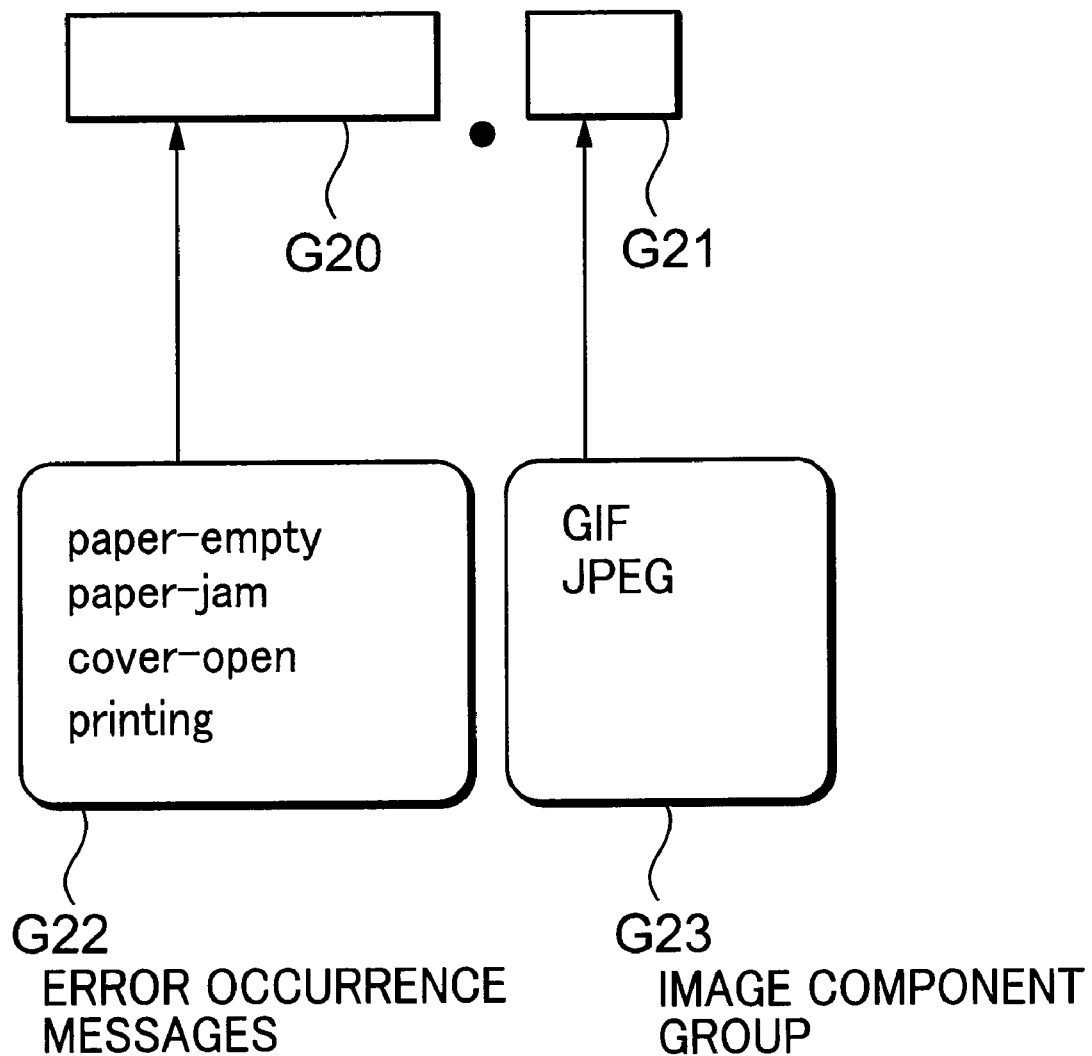
FIG. 9 is a diagram showing error messages which correspond to the error information when an error occurs and an example of the image name used at that time in the state monitoring unit installed in the printer controller according to the first and second embodiments of the present invention.

FIG. 9 is a diagram showing an example of error occurrence messages which corresponds to the error information when an error occurs and the image component group used at that time in the state monitoring unit 3 installed in the printer controller according to one embodiment of the present invention.

The state monitoring unit 3, as shown in FIG. 3, first makes the browser 12 perform the initial display processing of the right frame G4 (Step S30). Then, with reference to the printer information database 6 which manages the printer information, the state of the relevant printer is retrieved (Step S31). When whether an error is occurring is judged (Step S32) and the error occurs, the corresponding error ID is checked (Step S35) and error occurrence messages and an image are displayed on the browser 12 as error information (Step S36). For the image, the image component group 4 prepared for displaying the error occurrence is used. At that time, the file name of the corresponding file, for example, as shown in FIG. 9, consists of error occurrence messages G22 which corresponds to the error information when an error occurs and an extension G23 indicating the data format of the image component group. Conversely, if no error is occurring, the ID indicating a normal state is checked (Step S33) and the message indicating the normal state and the image are displayed on the browser 12 (Step S34). Then, using a general-purpose interface, the current time is obtained and displayed on the browser 12 as the printer information acquisition time (Step S37). Subsequently, accessory data such as configuration information is obtained and displayed (Steps S38 and S39). Further, when the state acquisition button of the printer on the same frame is monitored and that a user who uses a client performs the operation regarding the printer operation is detected, the printer information about the printer operation is updated with reference to the printer information database 6.

Figure 4:
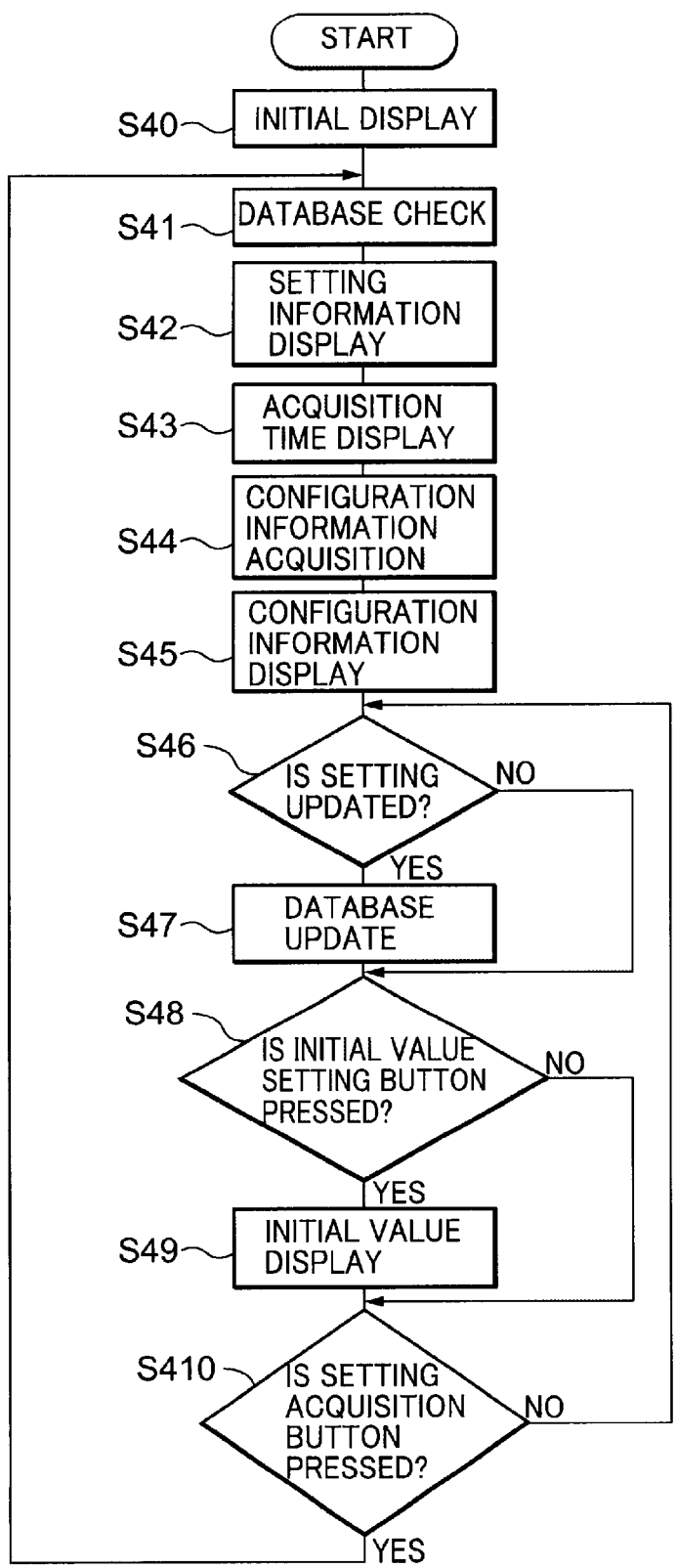
FIG. 4 is a flowchart showing the function of the setting control unit installed in the printer controller according to the first embodiment of the present invention.

Then, the operation of the setting control unit 2 which performs the operation setting change processing of the printer (Step S213) in FIG. 2 is described referring to the flowchart of FIG. 4.

FIG. 4 is a flowchart showing the operation of the setting control unit 2 installed in the printer controller according to one embodiment of the present invention.

The setting control unit 2, as shown in FIG. 4, first makes the browser perform the initial display processing of the right frame G4 (Step S40). Then, with reference to the printer information database 6 (shown in FIG. 1) which manages the printer information, the state of the pertinent printer is retrieved and the setting information of the printer obtained from such retrieval is displayed (Step S42). Using a general-purpose interface, the current time is obtained and displayed as the printer information acquisition time (Step S43). Next, accessory data such as configuration information is obtained and displayed (Steps S44 and 45). Subsequently, when the operation of pressing the setting update button arranged on the same frame is detected, the contents of the setting items of the printer which are changing are sent to the printer information database 6 and the setting of the printer is updated (Steps S46 and S47). Moreover, when a user who uses a client detects that the initial setting value setting button is pressed, an initial setting value is displayed on the browser (Steps S48 and 49). Subsequently, when the operation setting acquisition button of the printer arranged on the same frame is monitored and that the user performs the operation is detected, the printer operation display information is updated with reference to the printer information database 6 (Step S410).

Furthermore, the printer controller according to the embodiment of the present invention is embodied as a program and such program can be recorded in a recording medium. The storage medium storing such program may be acceptable if it can store the program in which the printer controller of the present invention is embodied. For example, a floppy disc, CD-ROM, CD-RW, DVD-ROM, DVD-R, DVD-RAM, PD, magneto-optical disk, high-speed magnetic tape, magnetic tape, Zip drive and super disc are listed.

According to the printer controller described above, such printer controller allows a printer server to be provided with the function of a web server which performs communication with a browser via a network. Further, such printer controller allows a printer server to be provided with the function of performing the operation monitoring, check and/or instruction of the printer A9 and/or printer B10 connected to the printer server with reference to a URL sent from the browser. Accordingly, when the operating state of such printer must be known on a client, the operating state of such printer can immediately be identified.

Besides, when a new printer is installed, because the step of individually installing the dedicated controller which corresponds to the new printer in each client is not needed, the workload required for installing the printer in a network can greatly be reduced.

Further, the main control unit 1 for communicating with a printer server and the printer information database 6 which manages in a batch the printer information sent from all printers connected to the main control unit 1 are provided. The main control unit 1 receives the browser information sent from the client browser 12 from the web server unit 11. The main control unit 1 send the printer operation setting request and/or change request to the printer information database 6 as needed. Accordingly, whenever a new printer is added to the network, because the workload of updating the environment of the entire printer server is not needed, the workload required for additionally installing in the network can greatly be reduced. Moreover, because all the printer information connected to the network can immediately be detected, the maintainability of the network can be improved.

Furthermore, because the operating state of the printer is displayed as an image created using a graphical user interface by displaying the printer information on the client browser 12, a user who uses a client machine can easily identify the operating state of the printer.

Besides, the main control unit 1 comprises the state monitoring unit 3 which obtains the operating state of a printer and the setting control unit 2 which obtains the operation setting value of the printer from the printer information database 6 and updates the setting value as needed. The setting control unit 2 and the state monitoring unit 3 are installed in the main control unit 1 independently if of the printer information database 6, respectively. Accordingly, whenever a new printer is added to a network, because the environment of the control unit and the entire printer server need not be updated, the workload required for additionally installing the printer in the network can greatly be reduced.

Besides, the setting control unit 2 and/or the state monitoring unit 3 is installed corresponding to the printer. Accordingly, whenever a new printer is added to the network, the workload regarding the additional setting of the printer can be reduced. This is because the setting control unit 2 and/or the state monitoring unit 3 which corresponds to the new printer is simply be installed and the environment of the main control unit 1 and the entire printer server 11 need not be updated.

Further, when the program in which the printer controller according to this embodiment is embodied is recorded in a recording medium, the program can easily be installed in a printer server even if such program becomes a high-capacity one.

(Second Embodiment)

Next, the printer controller according to another embodiment of the present invention is shown. Because the printer controller according to the present invention has the same function of the printer controller according to the embodiment of the present invention described above except the points described later, the same description as that described above is omitted.

Figure 5:
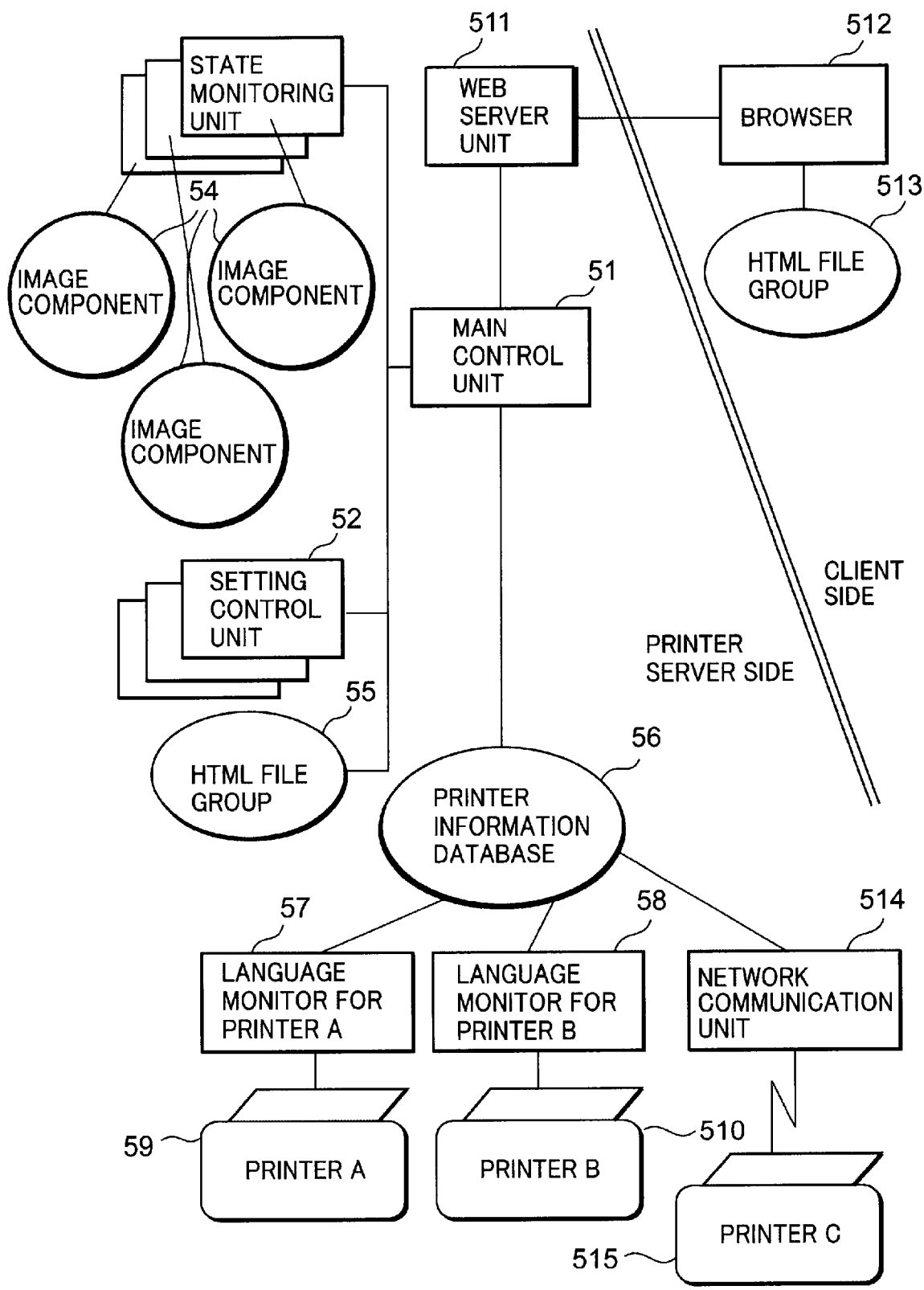
FIG. 5 is a block diagram showing the configuration of the printer controller according to the second embodiment of the present invention.

FIG. 5 is a block diagram showing the configuration of the printer controller according to one embodiment of the present invention.

Figure 6:
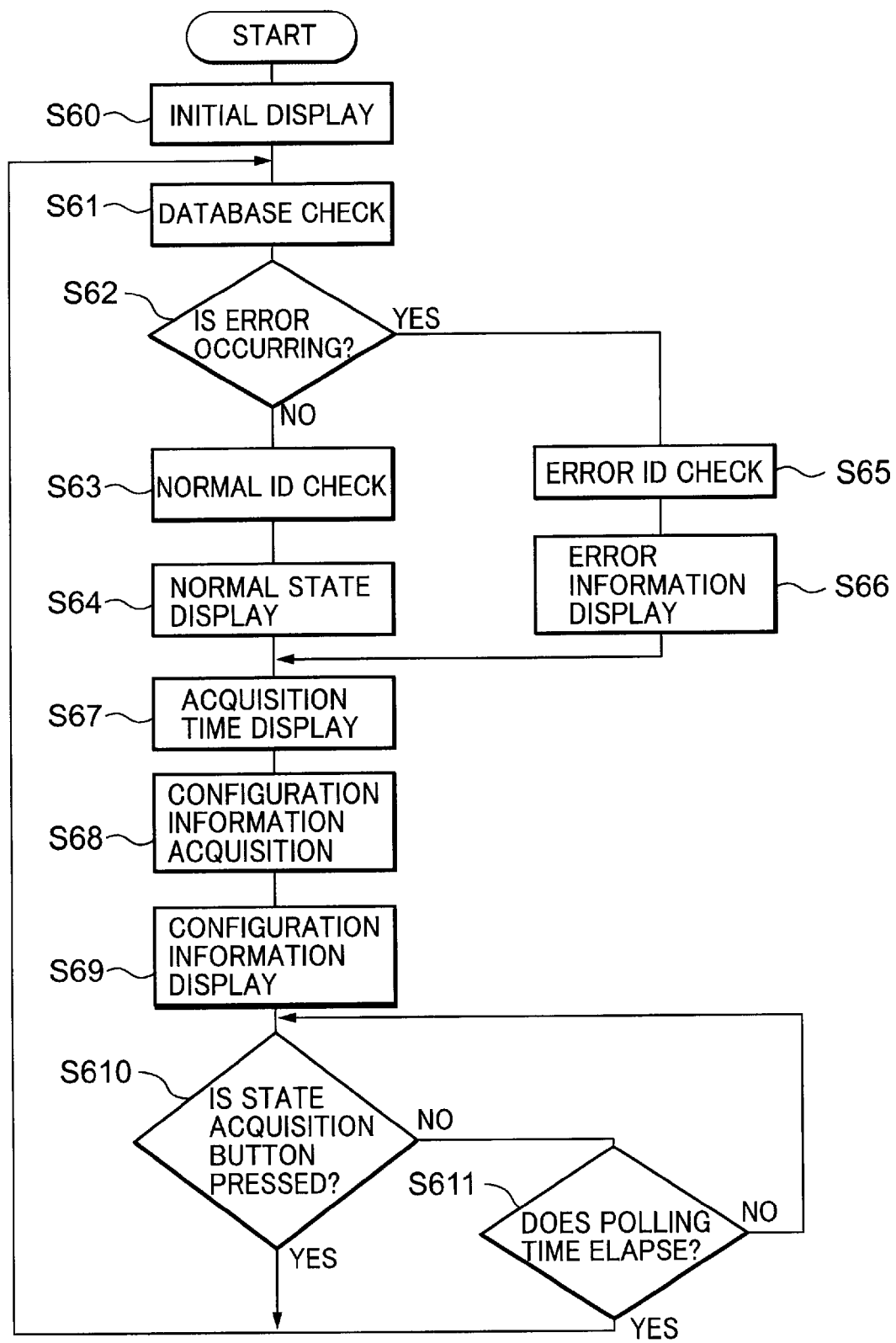
FIG. 6 is a flowchart showing the function of the state monitoring unit installed in the printer controller according to the second embodiment of the present invention.

FIG. 6 is a flowchart showing the function of the state monitoring unit installed in the printer controller according to one embodiment of the present invention.

Figure 7:
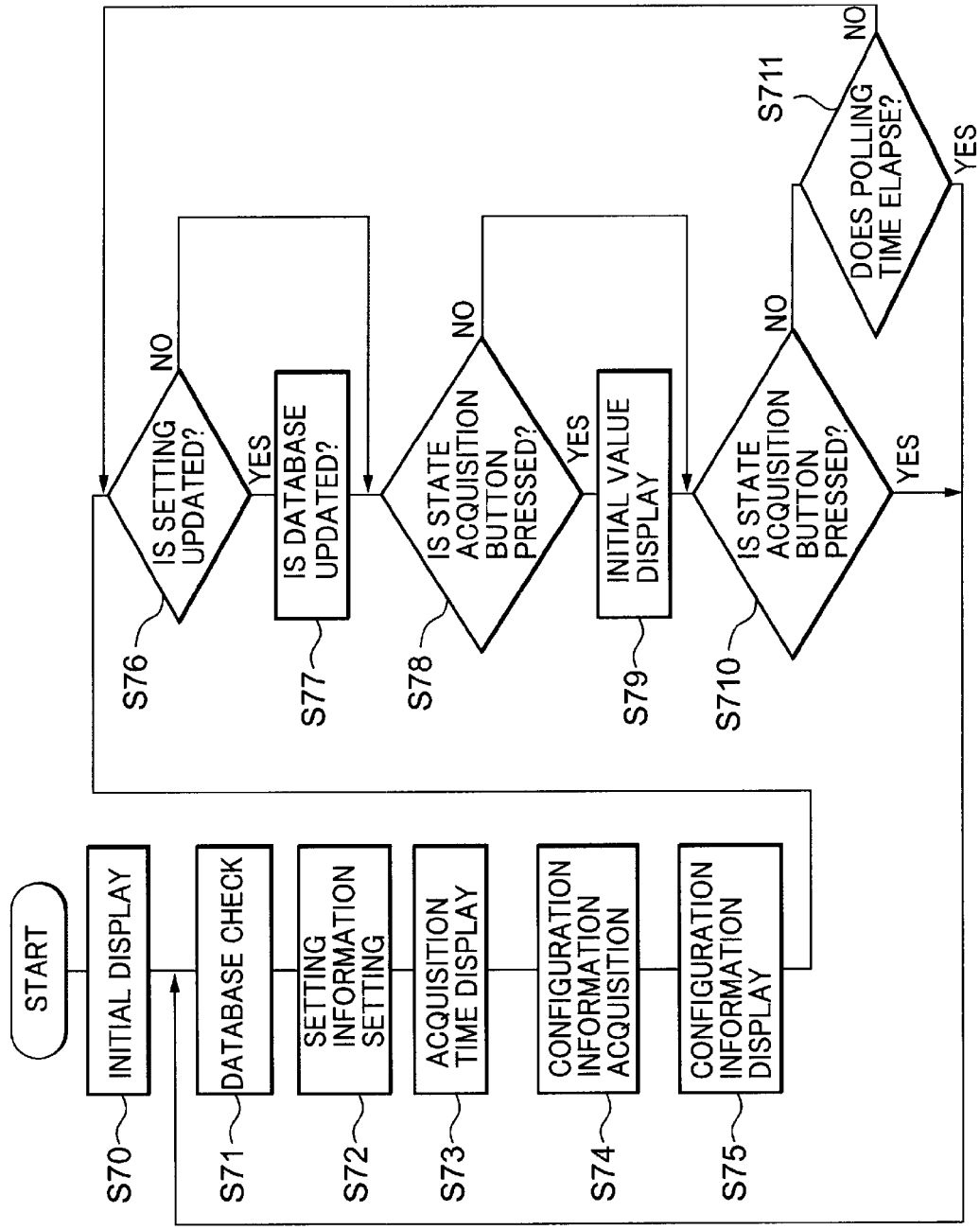
FIG. 7 is a flowchart showing the function of the control unit installed in the printer controller according to the second embodiment of the present invention.

FIG. 7 is a flowchart showing the function of the setting control unit installed in the printer controller according to one embodiment of the present invention.

FIG. 5 is a block diagram showing the configuration of the printer controller according to one embodiment of the present invention. The printer controller shown in FIG. 5 and the printer controller shown in FIG. 1 have two differences. The first difference is in that an image component 54 is attached to each state monitoring unit 3. The second difference is in that a printer installed over a network is also contained in the printer managed by the printer information database 6. When image data is attached to each state monitoring unit 3, a main control unit 51 increases in its capacity. However, because the image which matches the type of a printer can be provided, a printer server 511 can be provided with an appropriate and detailed image.

Next, the function of a state monitoring unit 53 of the printer controller according to another embodiment of the present invention shown in FIG. 5 is shown in FIG. 6.

The state monitoring unit 53 of the printer controller according to the embodiment of the present invention shown in FIG. 1 described above implements acquisition of printer information by a regular polling state monitoring means. As shown in FIG. 6, Step S611 judges the execution of polling. Care must be taken of the operation because a load applies to a network depending on the time setting of polling intervals. However, even if the state acquisition button is not pressed, because the printer operating state is updated, the workload of a user who uses a client can be reduced. Moreover, such a polling state monitoring means uses a timer. Such timer executes the polling state monitoring means by using an OS standard open interface.

Next, the function of a setting control unit 52 of the printer control unit according to another embodiment of the present invention shown in FIG. 5 is shown in FIG. 7.

The state monitoring unit of the printer controller according to the embodiment of the present invention shown in FIG. 1 described above implements acquisition of the printer information by the regular polling state monitoring means. As shown in FIG. 7, Step S711 judges the execution of polling. Care must be taken of the operation because a load applies to a network depending on the time setting of polling intervals. However, even if the state acquisition button is not pressed, because the printer operating state is updated, the workload of a user who uses a client can be reduced. Moreover, such a polling state monitoring means uses a timer. Such timer executes the polling state monitoring means by using an OS standard open interface.

According to the printer controller described above, the setting control unit 2 has the polling setting control means which executes polling every fixed time and, therefore, when a preset, predetermined time elapses, the printer operating state will automatically be updated. Accordingly, because a user need not perform a update procedure on purpose, the workload of a client machine user can be reduced.

Further, the setting control unit 3 has the polling setting control means which executes polling every fixed time and, therefore, when a preset, predetermined time elapses, the printer operating state will automatically be settled. Accordingly, because a user need not perform a update procedure, the workload of a user of the client machine can be reduced.

Furthermore, because the state monitoring unit 3 has the image component 54 which is an image data unit for creating an image file, an appropriate and detailed image which corresponds to the printer can be provided.

The printer controller of the present invention is installed over a network to which a printer server, a client and a printer are connected. The printer controller performs the communication between the client and printer via the printer server. the printer server has the function of a web server and the function of setting at least one or more of the operation monitoring, check, and instruction of the printer, and, therefore, the printer operating state can immediately be identified when the printer operating state must be obtained on the client. Besides, because the step of individually installing the dedicated controller which corresponds to the printer used in the network in each client which is scheduled to use such printer is not needed, the workload required for installing the printer in the network can greatly be reduced.

What is claimed is:

1. A printer controller for a printer server in communication with a network, a client and a printer, the printer controller comprising:

a control unit for controlling the printer server;

a web server in communication with said control unit; and a database in communication with said control unit and for storing printer information received from said printer in a batch, wherein said control unit includes:

a state monitoring unit which is adapted to obtain an operating state of said printer;

a setting control unit which is adapted to obtain an operation setting value of the printer and to update a setting value, wherein at least one of the state monitoring unit and the setting control unit includes a polling monitor which executes a poll every fixed time; and an updating unit which makes the updating operation of at least one of the state monitoring unit and the setting control unit possible by executing an operation for updating even before a predetermined period of time elapses from previous polling.

2. The printer controller of claim 1, wherein the control unit receives browser information sent from a client browser and an operation setting request and/or change request of the printer is sent to the database as needed.

3. The printer controller of claim 1, wherein the control unit receives printer information form the database.

4. The printer controller of claim 1, wherein the printer information is forwarded to a client browser for display.

5. The printer controller according to claim 2, wherein said setting control unit and the state monitoring unit are installed in the printer server independently of the database, respectively.

6. The printer controller according to claim 5, wherein the setting control unit and/or the state monitoring unit is installed corresponding to the printer.

7. The printer controller according to claim 5, wherein the state monitoring unit has an image data unit for creating an image file.

8. A storage medium recording a program, and a recording medium recording the program in which the printer controller of claim 1 is embodied.

9. A printer controller for a printer server in communication with a network, a client with a browser and a printer, the printer controller comprising:
- a control unit for controlling the printer server;
- a web server in communication with said control unit and said browser; and
- a database in communication with said control unit and for storing printer information received from said printer in a batch, wherein said control unit includes:
  - a state monitoring unit which is adapted to obtain an operating state of said printer;
  - a setting control unit which is adapted to obtain an operation setting value of the printer and to update a setting value, wherein at least one of the state monitoring unit and the setting control unit includes a polling monitor which executes a poll every fixed time; and
  - an updating unit which makes the updating operation of at least one of the state monitoring unit and the setting control unit possible by executing an operation for updating even before a predetermined period of time elapses from previous polling.

10. A printer controller for a printer server in communication with a network, a client and a shared printer, the printer controller comprising:
- a control unit for controlling the printer server;
- a web server in communication with said control unit and said client through said network and adapted to receive a request from said client; and
- a database in communication with said control unit wherein said control unit includes:
  - a state monitoring unit which is adapted to obtain an operating state of said shared printer in response to said request therefor;
  - a setting control unit which is adapted to obtain an operation setting value of said shared printer in response to said request therefor and to update a setting value, wherein at least one of the state monitoring unit and the setting control unit includes a polling monitor which executes a poll every fixed time; and
  - an updating unit which makes the updating operation of at least one of the state monitoring unit and the setting control unit possible by executing an operation for updating even before a predetermined period of time elapses from previous polling.

11. A printer controller for a printer server in communication with a network, a client having a browser and a shared printer, the printer controller comprising:
- a control unit for controlling the printer server;
- a web server in communication with said control unit and said client through said network, wherein said web server is adapted to receive a request from said browser and to send home page data containing information about said shared printer in response to a request therefor; and
- a database in communication with said control unit wherein said control unit includes:
  - a state monitoring unit which is adapted to obtain an operating state of said printer in response to said request;
  - a setting control unit which is adapted to obtain an operation setting value of the printer in response to said request and to update a setting value, wherein at least one of the state monitoring unit and the setting control unit includes a polling monitor which executes a poll every fixed time; and
  - an updating unit which makes the updating operation of at least one of the state monitoring unit and the setting control unit possible by executing an operation for updating even before a predetermined period of time elapses from previous polling.

12. The printer controller of claim 11, wherein said control unit is adapted to receive an operation setting request and/or operation setting change request of said shared printer sent from said client browser from said web server unit and to send said operation setting request and/or operation setting change request to said database based on said request thereof.

13. The printer controller of claim 11, wherein:
said setting control unit and said state monitoring unit are installed in said control unit independently of the database, respectively.

14. The printer controller according to claim 13, wherein said setting control unit and/or said state monitoring unit is installed corresponding to each printer, respectively.

15. The printer controller of claim 13, wherein said setting control unit is adapted to record a setting state in the database.

16. The printer controller of claim 13, wherein said state monitoring unit is adapted to record the operation state in the database.

17. The printer controller of claim 13, wherein said state monitoring unit includes an image data unit for creating the image file.

* * * * *